(12) United States Patent
Eom

(10) Patent No.: US 8,726,777 B2
(45) Date of Patent: May 20, 2014

(54) CUTTING WHEEL FOR GLASS SUBSTRATE

(75) Inventor: Soung-Yeoul Eom, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/089,126

(22) Filed: Mar. 24, 2005

(65) Prior Publication Data

US 2005/0211047 A1 Sep. 29, 2005

(30) Foreign Application Priority Data

Mar. 27, 2004 (KR) ........................ 10-2004-0021018

(51) Int. Cl.
*B26D 3/08* (2006.01)
*C03B 33/10* (2006.01)

(52) U.S. Cl.
USPC ................ 83/886; 83/332; 83/663; 83/676; 83/678; 83/848; 30/319; 30/347; 30/355; 30/365; 225/96

(58) Field of Classification Search
USPC ........... 83/332, 678, 331, 663, 676, 835, 846, 83/848–852, 879, 880, 886, 887; 30/319, 30/347, 357, 365, 355; 76/115; 125/13.01, 125/15, 20, 22; 225/2, 96, 96.5
See application file for complete search history.

(56) References Cited

U.S. PATENT DOCUMENTS

| 648,791 | A | * | 5/1900 | Raynal | ........................ | 83/115 |
| 3,203,140 | A | * | 8/1965 | Hallez | ........................ | 451/541 |
| 3,346,956 | A | * | 10/1967 | Wezel et al. | .................... | 30/347 |
| 3,978,752 | A | * | 9/1976 | Meaden et al. | ................. | 83/678 |
| 4,167,132 | A | * | 9/1979 | Zontelli | ......................... | 83/676 |
| 6,422,229 | B1 | * | 7/2002 | Padrinao et al. | ................ | 125/25 |

* cited by examiner

*Primary Examiner* — Clark F. Dexter
(74) *Attorney, Agent, or Firm* — Brinks Gilson & Lione

(57) ABSTRACT

A cutting wheel is provided for cutting a liquid crystal panel. The cutting wheel is disc shaped and includes a plurality of grooves disposed along an edge of the cutting wheel and cutting portions formed between the grooves. A pattern having a predetermined period is formed by multiple grooves and cutting portions. The grooves in each period have the same or different widths and depths and the cutting portions have probe shapes or cutting blades of different lengths. The cutting wheel is applied to dummy areas of the glass substrates forming the liquid crystal panel.

4 Claims, 5 Drawing Sheets

CUTTING WHEEL FOR GLASS SUBSTRATE

PRIORITY CLAIM

This application claims the benefit of Korean Patent Application No. P2004-21018 filed in Korea on Mar. 27, 2004, which is hereby incorporated by reference.

TECHNICAL FIELD

The present application relates to a cutting wheel for a glass substrate, and more particularly, to a cutting wheel of a glass substrate capable of enhancing quality of a cut surface when cutting a large area glass substrate, and a method for fabricating a liquid crystal display (LCD) device using the same.

BACKGROUND

Generally, an LCD device is a display device for displaying a desired image by individually supplying a data signal according to image information to liquid crystal cells arranged in a matrix and controlling an optical transmittance of the liquid crystal cells.

In the LCD device, thin film transistor array substrates are formed on a large area mother glass, color filter substrates are formed on an additional mother substrate, and then the two substrates are attached to each other. Accordingly, liquid crystal panels are simultaneously formed thereby to enhance yield. A process for cutting the liquid crystal panels into each unit liquid crystal panel is used.

The process for cutting liquid crystal panels into each unit liquid crystal panel includes forming a groove of a certain depth on a surface of the mother substrate by using a cutting wheel, and cutting a liquid crystal panel by propagating a crack from the groove by external impact. The process for cutting liquid crystal panels into each unit liquid crystal panel will be explained in more detail with reference to the attached drawings.

FIG. 1 is an exemplary view schematically showing a planar structure of a unit liquid crystal panel having a thin film transistor array substrate and a color filter substrate attached to each other in an LCD device.

Referring to FIG. 1, a liquid crystal panel 10 comprises an image display portion 13 in which liquid crystal cells are arranged in a matrix, a gate pad portion 14 connected to gate lines of the image display portion 13, and a data pad portion 15 connected to data lines of the image display portion 13. The gate pad portion 14 and the data pad portion 15 are formed at an edge of the thin film transistor array substrate 1 that is not overlapped with the color filter substrate 2. The gate pad portion 14 supplies a scan signal supplied from a gate driver integrated circuit to the gate lines of the image display portion 13, and the data pad portion 15 supplies image information supplied from a data driver integrated circuit to the data lines of the image display portion 13.

Although not shown, on the thin film transistor array substrate 1 of the image display portion 13, the data lines to which image information is applied are arranged to be perpendicular to the gate lines to which a scan signal is applied. At each intersection between the data lines and the gate lines, a thin film transistor for switching liquid crystal cells, a pixel electrode connected to the thin film transistor for driving the liquid crystal cells, and a passivation layer formed on the entire surface of the thin film transistor array substrate for protecting the pixel electrode and the thin film transistor are provided. On the color filter substrate 2 of the image display portion 13, color filters deposited according to each cell region by a black matrix and a transparent common electrode corresponding to the pixel electrode formed on the thin film transistor array substrate 1 are provided.

The thin film transistor array substrate 1 and the color filter substrate 2 face each other with a cell gap, and are attached to each other by a sealant formed at an outer periphery of the image display portion 13. Also, a liquid crystal layer (not shown) is formed in the cell gap between the thin film transistor array substrate 1 and the color filter substrate 2.

FIG. 2 is an exemplary view showing a sectional structure of liquid crystal panels formed by attaching a first mother substrate 20 on which the thin film transistor array substrates 1 are formed to a second mother substrate 30 on which the color filter substrates 2 are formed.

Referring to FIG. 2, the unit liquid crystal panels are formed so that one side of each thin film transistor array substrate 1 is protruded longer than that of each color filter substrate 2. The reason is because the gate pad portion 14 and the data pad portion are formed at the edge of each thin film transistor array substrate 1 that is not overlapped with the color filter substrate 2.

Accordingly, the color filter substrates 2 formed on the second mother substrate 30 are spaced from each other by a dummy region 31, which corresponds to an area in which the thin film transistor array substrate 1 formed on the first mother substrate is protruded longer than the color filter substrate 2. Each unit liquid crystal panel is properly arranged to utilize the first mother substrate 20 and the second mother substrate 30 to the maximum. Generally, the unit liquid crystal panels are spaced from each other by a dummy region 32, and a dummy region 21 for a processing margin is formed at the edge of the first and second mother substrates 20 and 30.

After attaching the first mother substrate 20 where the thin film transistor array substrates 1 are formed to the second mother substrate 30 where the color filter substrates 2 are formed, liquid crystal panels are individually cut. At this time, the dummy region 31 for separating the color filter substrates 2 of the second mother substrate 30 from each other, the dummy region 32 for separating the unit liquid crystal panels from each other, and the dummy region 21 formed at the edge of the first and second mother substrates 20 and 30 are simultaneously removed.

FIGS. 3A and 3B are exemplary views showing one embodiment of a cutting wheel used to cut a liquid crystal panel. As shown, a disc-shaped cutting wheel 40 is provided with a through hole 41 for accommodating a support spindle (not shown) at the center thereof, and sharp blades 42 are formed along the edge of the cutting wheel 40.

The cutting wheel 40 is adhered to a glass liquid crystal panel with a certain pressure and rotates thereby to form a groove of a certain depth. Then, the liquid crystal panel is cut by propagating a crack downward by external impact.

However, the conventional cutting wheel 40 may form an undesired groove on the liquid crystal panel since it is susceptible to slide on the liquid crystal panel. Also, it is impossible to precisely control the propagation direction of the crack from the groove formed on the liquid crystal panel. Additionally, high pressure of the cutting wheel 40 on the liquid crystal panel is required, and the quality of the cut surface of the liquid crystal panel may be deteriorated due to the large contact surface between the cutting wheel and the liquid crystal panel.

SUMMARY OF THE INVENTION

In one embodiment, a disc shaped cutting wheel includes a plurality of grooves formed along an edge of the cutting wheel and a plurality of cutting portions formed between the grooves, the cutting portions from a material suitable to cut glass.

In another embodiment, a method for fabricating an LCD device, includes: providing a first substrate in which a plurality of thin film transistor array substrates are formed; providing a second substrate in which a plurality of color filter substrates are formed; attaching the first substrate and the second substrate to each other to form a liquid crystal panel having a plurality of unit liquid crystal panels; and cutting the liquid crystal panel into the unit liquid crystal panels using a cutting wheel having grooves in an edge thereof and cutting portions disposed between the grooves.

In another embodiment, a method for cutting a glass substrate includes: rotating a cutting wheel having grooves in an edge thereof and cutting portions disposed between the grooves; positioning at least one of the glass substrate and the cutting wheel such that the glass substrate and the cutting wheel are in contact; forming a groove of a predetermined depth in the glass substrate; repositioning at least one of the glass substrate and the cutting wheel such that the glass substrate and the cutting wheel are no longer in contact; and propagating a crack along a direction of the groove to separate the glass substrate into a plurality of portions.

In any of the embodiments, the cutting wheel may have one or more of the following characteristics: the grooves are separated by different distances, the cutting portions include a first cutting blade having a first length and a second cutting blade having a second length, at least one of the first cutting blades is positioned between each second cutting blade, a plurality of the first cutting blades are positioned between each second cutting blade, a ratio of a length of the first cutting blade and a length of the second cutting blade is 1:2, a period between the second cutting blades is about 201 to about 500 μm, the grooves have the same size, the grooves comprise a first groove having a first depth and a second groove having a second depth, the first and second grooves alternate, a ratio between the first and second depths is 2:1, a ratio between a first width of the first groove and a second width of the second groove is 2:3, a ratio between the first width and a first depth of the first groove is 1:1, a ratio between the second width and a second depth of the second groove is 4:3, the cutting portions have probe shapes, or the cutting portions have a repeated pattern with a predetermined period.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
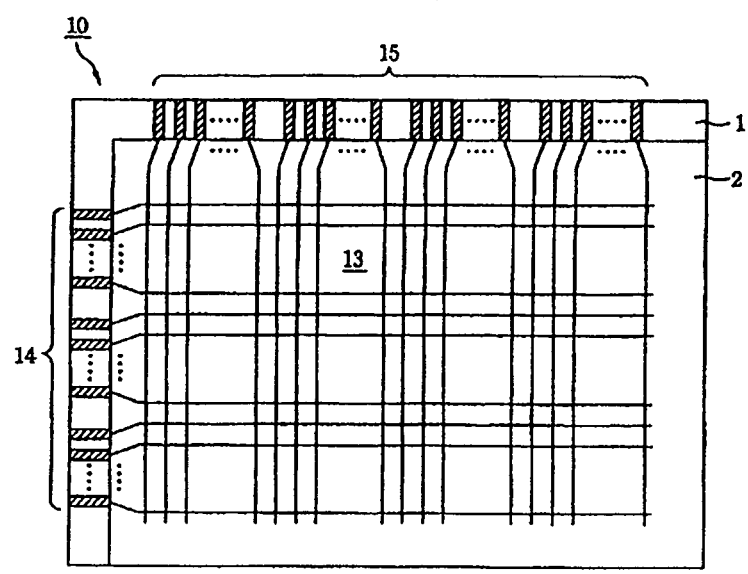
FIG. 1 is an exemplary view schematically showing a planar structure of a prior art unit liquid crystal panel that a thin film transistor array substrate and a color filter substrate are attached to each other in an LCD device.
Figure 2:
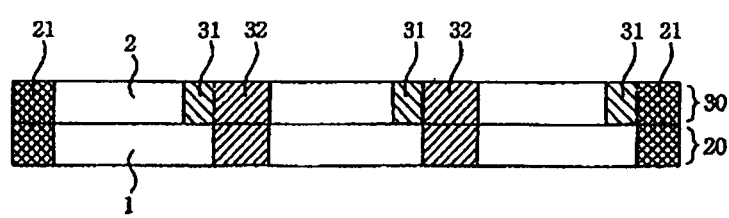
FIG. 2 is an exemplary view showing a sectional structure of prior art liquid crystal panels formed by attaching a first mother substrate on which the thin film transistor array substrates are formed to a second mother substrate on which the color filter substrates are formed in FIG. 1.
Figure 3A:
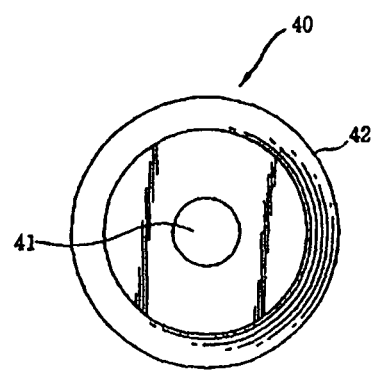
FIGS. 3A and 3B are views showing a cutting wheel used to cut a liquid crystal panel in accordance with the prior art.
Figure 3B:
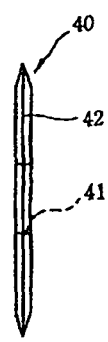
Figure 4:
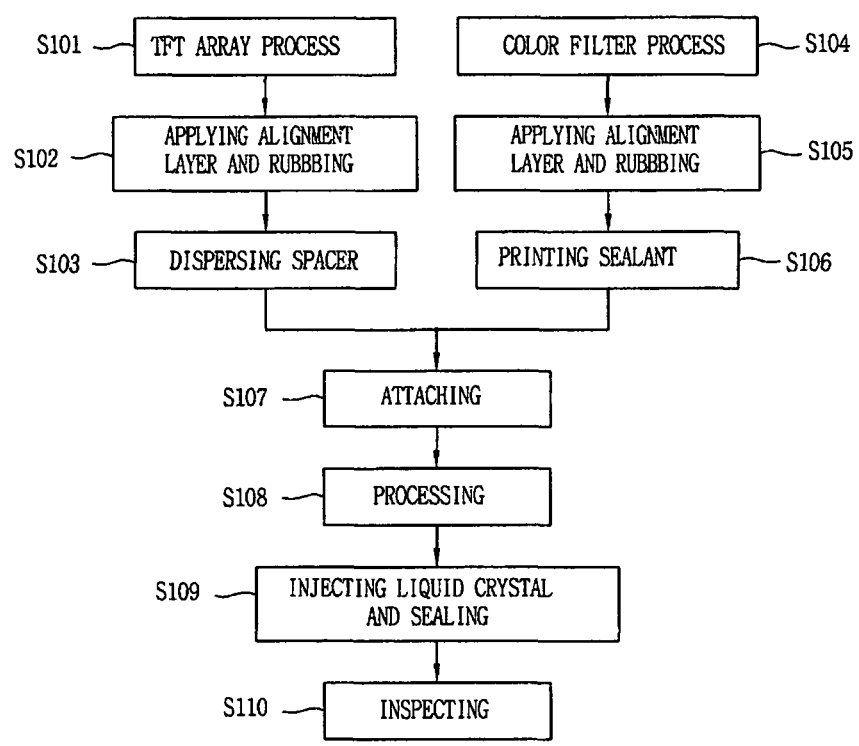
FIG. 4 is a view showing processes for fabricating an LCD device in one embodiment.

Generally, a process for fabricating an LCD device is divided into a driving device array substrate process for forming a driving device at a lower substrate, a color filter substrate process for forming color filters at an upper substrate, and a cell process. The process for fabricating an LCD device will be explained with reference to FIG. 4.

First, a plurality of gate lines and data lines for defining pixel regions are formed on a lower substrate by a driving device array process, and a thin film transistor, a driving device connected to the gate lines and the data lines, is formed at each pixel region (S101). Also, a pixel electrode connected to the thin film transistor is formed by the driving device array process, which is used to drive a liquid crystal layer as a signal is applied thereto through the thin film transistor.

Also, a color layer of R, G and B for realizing colors and a common electrode are formed on an upper substrate by a color filter process (S104).

Then, an alignment layer is respectively deposited on the upper substrate and the lower substrate, and the alignment layer is rubbed so as to provide an anchoring force or a surface fixing force (that is, a pretilt angle and an alignment direction) to liquid crystal molecules of a liquid crystal layer formed between the upper substrate and the lower substrate (S102, S105). Then, a spacer for constantly maintaining a cell gap is dispersed on the lower substrate, a sealing material is deposited at an outer periphery of the upper substrate, and then the upper substrate and the lower substrate are attached to each other by pressure (S103, S106, S107). The upper substrate and the lower substrate are formed of a large area glass substrate. That is, since a plurality of panels are formed on the glass substrate of a large area and a TFT and a color filter layer are formed at each panel, the glass substrate is cut to fabricate each unit liquid crystal panel (S108). Then, liquid crystal is injected into each unit liquid crystal panel through a liquid crystal injecting hole and the liquid crystal injecting hole is sealed thereby to form a liquid crystal panel. Then, each liquid crystal panel is inspected thereby to fabricate an LCD device (S109, S110).

The liquid crystal layer is formed by a liquid crystal dropping method, not a liquid crystal injection method. In the liquid crystal dropping method, liquid crystal is dropped on the glass substrate, the lower substrate and the upper substrate are attached to each other, and then the attached substrates are cut into unit liquid crystal panels. That is, the liquid crystal layer is formed before cutting the liquid crystal panel.

A cutting wheel used to cut the liquid crystal panel can be provided with cutting blades having different lengths at the edge thereof or can be provided with cutting blades having a sharp probe shape and formed at a contact region between grooves consecutively formed at the edge thereof without a separation distance.

The cutting wheel used to fabricate an LCD device according to one embodiment of the present invention will be explained in more detail with reference to the attached drawings.

Figure 5A:
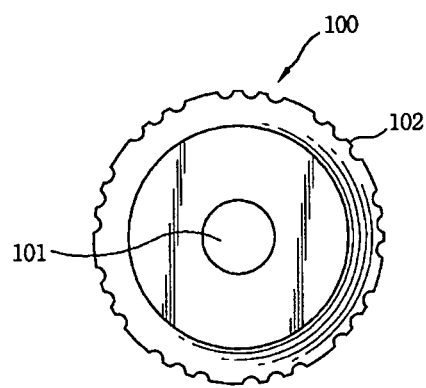
FIGS. 5A and 5B are views showing a cutting wheel for cutting a liquid crystal panel according to one embodiment of the present invention.
Figure 5B:
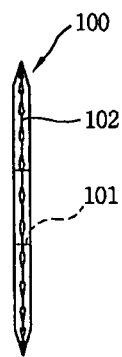

FIGS. 5A and 5B are views schematically showing a cutting wheel used to cut a liquid crystal panel according to one embodiment of the present invention, in which FIG. 5A is a frontal view and FIG. 5B is a lateral view.

As shown, a disc shaped cutting wheel 100 is provided with a through hole 101 for accommodating a support spindle (not shown) at the center thereof, and sharp cutting blades 102 are formed along the edge of the cutting wheel 100. The sharp cutting blades are separated by a predetermined distance.

The cutting blade 102 is defined by grooves formed along the edge of the cutting wheel 100 with a predetermined separation. That is, the cutting blade 102 is formed between the grooves, and the length of the cutting blade 102 is determined by the distance between the grooves.

Figure 6:
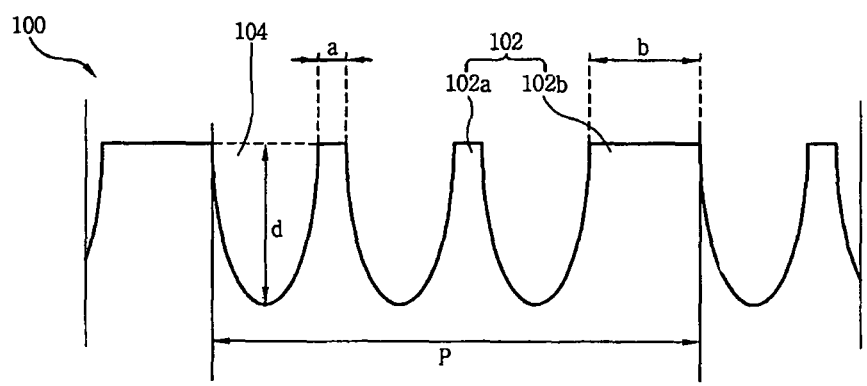
FIG. 6 is an enlargement view of an edge of the cutting wheel according to one embodiment of the present invention.

FIG. 6 is an enlargement view of an edge of the cutting wheel according to one embodiment of the present invention. As shown, a plurality of grooves 104 with a depth d are formed along the edge of the cutting wheel 100 with different separation distances, and cutting blades 102 are formed between the grooves 104. A repeated pattern of the grooves 104 and cutting blade 102 having a particular period is present. As shown, the distances between the grooves 104 are different in the pattern, thus the lengths of the cutting blades 102 in the pattern are different.

For example, the cutting blade 102 is composed of a first cutting blade 102a having a first length a and a second cutting blade 102b having a second length b. The first cutting blade 102a and the second cutting blade 102b alternate with each other over the edge of the cutting wheel 100. The second cutting blades 102b are formed with a certain period, and at least one first cutting blade 102a is formed between the second cutting blades 102b.

In one embodiment, when two first cutting blades 102a are formed between the second cutting blades 102b, the first cutting blade 102a and the second cutting blade 102b have a length ratio, approximately 1:2 corresponding to the first length a and the second length b. That is, when the first length a is 25 μm, the second length b is 50 μm. Forming two first cutting blades 102a between the second cutting blades 102b means that three grooves 104 are formed. A period P of each second cutting blade 102b has a range of 201~500 μm. According to the period P, the length a of the first cutting blade 102a, the length b of the second cutting blade 102b, and the width of the groove 104 are determined. The groove 104 can be formed as a V-shape or a U-shape. The groove 104 can be formed in any shape by grinding or a process using an electric discharge device.

As aforementioned, cutting blades 102 having different sizes are formed along the edge of the cutting wheel 100 that contact, and are rotated on the glass liquid crystal panel at a predetermined pressure. The cutting blades 102 form a groove of a certain depth on the liquid crystal panel.

The cutting blades 102 decrease sliding on the liquid crystal panel and thereby prevent an undesired groove from being formed. Also, since the cutting blades 102 are in contact and are rotated on the liquid crystal panel, the propagation direction of the crack formed is constant and the pressure applied onto the liquid crystal panel by the cutting wheel 100 can be reduced.

As the pressure applied onto the liquid crystal panel by the cutting wheel 100 is reduced, the lifespan of the cutting wheel 100 can be prolonged. That is, while the cutting wheel 100 contacts the liquid crystal panel and is rotated, the cutting wheel 100 wears away. However, if the pressure of the cutting wheel on the liquid crystal panel is lowered, abrasion of the cutting wheel 100 is also decreased and thereby the lifespan of the cutting wheel 100 is increased.

Figure 7:
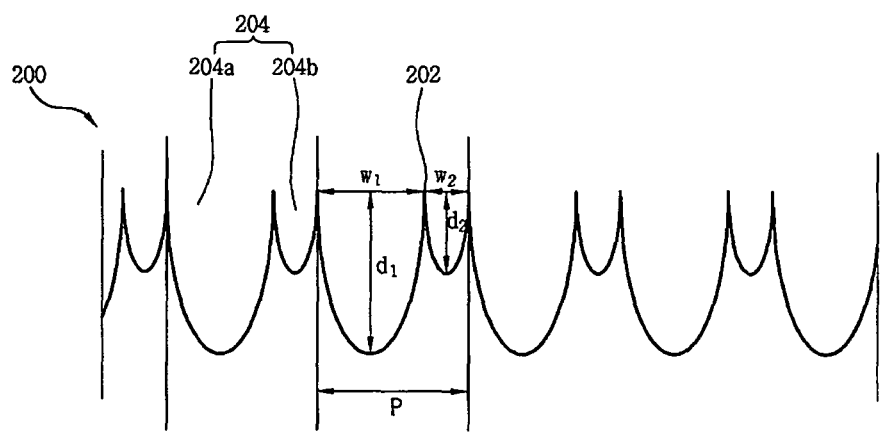
FIG. 7 is an enlargement view of an edge of the cutting wheel according to another embodiment of the present invention.

The grooves 104 can be consecutively formed along the edge of the cutting wheel without a separation. That is, the cutting blade 102 between the grooves 104 can be formed in a probe shape without a specific length. FIG. 7 shows a cutting wheel 200 having grooves 204 consecutively formed at an edge thereof without a separation according to another embodiment of the present invention.

As shown, a plurality of grooves 204 are consecutively formed along the edge of the cutting wheel 200, and the grooves 204 are composed of a first groove 204a having a first depth d1 and a second groove 204b having a second depth d2. The first groove 204a and the second groove 204b alternate with each other, and a depth ratio between the first depth d1 and the second depth d2 is 2:1. Also, a width ratio between a first width w1 of the first groove 204a and a second width w2 of the second groove 204b can be set to be 3:2. Sizes of the first and second grooves 204a and 204b can be varied according to a diameter of the cutting wheel 200. The diameter of the cutting wheel 200 indicates a diameter of the disc. Since a peripheral length of the edge of the cutting wheel 200 is varied according to the diameter of the disc, the depth of the groove, the width of the groove, or the size of the groove according to the width can be varied. It is also possible to set a ratio between the first depth d1 of the first groove 204a and the first width w1 of the first groove 204a as 1:1, and to set a ratio between the second depth d2 of the second groove 204b and the second width w2 of the second groove 204b as 4:3.

The cutting blade 202 is formed at a contact region between the first groove 204a and the second groove 204b. Since the first groove 204a and the second groove 204b are consecutively formed substantially without a separation, the cutting blade 202 has a probe shape that becomes sharper towards the outer side.

As above, a repeated pattern with a predetermined period contains at least two grooves 204. Although only the first groove 204a and the second groove 204b of different sizes are shown in drawing, multiple grooves of different sizes and/or multiple grooves of the same size can be formed within each period. The greater the number of grooves 204 within the period P is increased, the greater the number of the cutting blades 202. The period can be varied dependent on the number of the grooves 204. Likewise, the shape of the grooves 204 are not limited to the specific shape shown. For example, the grooves 204 can have various shapes such as a U shape, a V shape, etc. Also, the grooves 204 can be formed by grinding or a process using an electric discharge device.

The cutting wheel can be applied not only to a liquid crystal panel but also to any process for cutting a glass substrate.

As aforementioned, the cutting wheel used to cut the liquid crystal panel has cutting blades formed along the edge thereof with different separations. Accordingly, the pressure between the cutting blades and the liquid crystal panel is reduced and thus abrasion of the cutting blades is reduced, thereby increasing the lifespan of the cutting wheel. Moreover, as the lifespan of the cutting wheel is increased, the replacement period of the cutting wheel is prolonged thereby enhancing the productivity and reducing the purchase cost of the cutting wheel.

Additionally, the contact area between the cutting blades and the liquid crystal panel is decreased due to the grooves formed at the edge of the cutting wheel, so that the quality of the cut surface of the liquid crystal panel is enhanced and particles generated when forming the crack on the liquid crystal panel is reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A cutting wheel for cutting a liquid crystal panel, the cutting wheel comprising:
    a plurality of grooves disposed along a circular edge of the cutting wheel, wherein all of the grooves are U-shaped with no corners, each groove having a width and a maximum depth (d), the width including a width measured at and along the edge,
    wherein for each groove, the width measured at and along the edge is not equal to the maximum depth; and
    a plurality of cutting blades disposed between the U-shaped grooves along the edge,
    wherein the plurality of cutting blades is composed of a plurality of first cutting blades having a first cutting edge of a first length and a plurality of second cutting blades having a second cutting edge of a second length, wherein the first length does not equal the second length, the first cutting blades and the second cutting blades alternating with each other such that two of the first cutting blades are disposed between two successive ones of the second cutting blades;
    wherein the first and second cutting edges are substantially arcuate, the arcs thereof being centered at a center of the cutting wheel,
    wherein the first length of the first cutting edge of each of the first cutting blades is less than the width of each of the grooves measured at and along the edge,
    wherein a repeated pattern of the U-shaped grooves and the cutting blades have a predetermined period (p), and
    wherein the lengths of the cutting edges of the cutting blades and the widths of the grooves measured at and along the edge are determined according to the predetermined period (p).

2. The cutting wheel of claim 1, wherein a ratio of the first length of the first cutting edge of the first cutting blade and the second length of the second cutting edge of the second cutting blade is 1:2.

3. The cutting wheel of claim 1, wherein the predetermined period (p) between the second cutting blades is at about 201 to about 500 μm.

4. The cutting wheel of claim 1, wherein the U-shaped grooves are the same size.

* * * * *